(12) United States Patent
Hong et al.

(10) Patent No.: US 12,493,301 B2
(45) Date of Patent: Dec. 9, 2025

(54) DRIVING METHOD OF AUTOMATED GUIDED VEHICLE

(71) Applicant: SAMSUNG DISPLAY CO., LTD., Yongin-si (KR)

(72) Inventors: Hyunwoo Hong, Yongin-si (KR); Yonghun Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 53 days.

(21) Appl. No.: 18/416,315

(22) Filed: Jan. 18, 2024

(65) Prior Publication Data
US 2024/0385625 A1    Nov. 21, 2024

(30) Foreign Application Priority Data
May 16, 2023   (KR) .......................... 10-2023-0063350

(51) Int. Cl.
| | | |
|---|---|---|
| *G05D 1/646* | (2024.01) | |
| *G05D 1/244* | (2024.01) | |
| *G05D 105/20* | (2024.01) | |
| *G05D 107/70* | (2024.01) | |

(52) U.S. Cl.
CPC ........... *G05D 1/646* (2024.01); *G05D 1/2446* (2024.01); *G05D 2105/20* (2024.01); *G05D 2107/70* (2024.01)

(58) Field of Classification Search
CPC .. G05D 1/646; G05D 1/2446; G05D 2107/70; G05D 2105/20
USPC .......................................................... 701/23
See application file for complete search history.

(56) References Cited

U.S. PATENT DOCUMENTS

| | | | |
|---|---|---|---|
| 10,108,194 B1* | 10/2018 | Russell | G05D 1/0212 |
| 10,466,707 B2* | 11/2019 | Taylor | G05D 1/0214 |
| 2013/0020981 A1* | 1/2013 | Borchers | H02K 41/0354 |
| | | | 318/652 |
| 2018/0057049 A1* | 3/2018 | Stewart | B62D 6/10 |
| 2020/0183400 A1* | 6/2020 | Keehn | G05D 1/028 |
| 2020/0284883 A1* | 9/2020 | Ferreira | G01S 7/4815 |
| 2021/0247770 A1* | 8/2021 | Theos | B66F 9/0755 |
| 2021/0278222 A1* | 9/2021 | Fischer | G05D 1/0244 |
| 2021/0284233 A1* | 9/2021 | Katayama | G05D 1/0212 |
| 2022/0410898 A1* | 12/2022 | Nett | B60W 60/0025 |
| 2024/0067510 A1* | 2/2024 | Ulbrich | B66F 9/063 |
| 2024/0100702 A1* | 3/2024 | Saunders | G05D 1/6895 |

FOREIGN PATENT DOCUMENTS

| | | |
|---|---|---|
| JP | 4280940 | 6/2009 |
| JP | 2018-177002 | 11/2018 |
| JP | 7006889 | 1/2022 |
| KR | 10-1566744 | 11/2015 |

* cited by examiner

*Primary Examiner* — Yazan A Soofi
(74) *Attorney, Agent, or Firm* — F. CHAU & ASSOCIATES, LLC

(57) ABSTRACT

A driving method of an automated guided vehicle including a guide sensor and moving along a path guide, includes first scanning the path guide, while rotating at a first set angle, determining whether the path guide is detected during the first scanning, and if the path guide is not detected in the first scanning, performing a second scanning of the path guide while rotating at a second set angle.

20 Claims, 12 Drawing Sheets

FIG. 12

| AGV Stop Position | moving distance(mm) | Parameter | | Result (Count OK) | Rate OK |
|---|---|---|---|---|---|
| | | first scanning angle | second scanning angle | | |
| Wrong tag Position | 500 | 110 | 40 | 0 | 0% |
| | | 120 | 50 | 2 | 40% |
| | | 130 | 60 | 5 | 100% |
| | | 140 | 70 | 5 | 100% |
| Right Position | 630 | 110 | 40 | 5 | 100% |
| | | 120 | 50 | 5 | 100% |
| | | 130 | 60 | 5 | 100% |
| | | 140 | 70 | 5 | 100% |
| | 700 | 110 | 40 | 5 | 100% |
| | | 120 | 50 | 5 | 100% |
| | | 130 | 60 | 5 | 100% |
| | | 140 | 70 | 5 | 100% |
| Run over Position | 800 | 110 | 40 | 0 | 0% |
| | | 120 | 50 | 2 | 40% |
| | | 130 | 60 | 3 | 60% |
| | | 140 | 70 | 3 | 60% |

DRIVING METHOD OF AUTOMATED GUIDED VEHICLE

CROSS-REFERENCE TO RELATED APPLICATION

This application claims priority to and all the benefits accruing therefrom under 35 U.S.C. 119 of Korean Patent Application No. 10-2023-0063350 filed on May 16, 2023, at the Korean Intellectual Property Office, the entire contents of which are incorporated herein by reference.

BACKGROUND

1. Field

The present disclosure relates to a driving method of an automated guided vehicle, and more particularly, to a driving method of an automated guided vehicle including a driving returning function.

2. Description of the Related Art

Due to the automation of production sites, material handling equipment is used in many parts of production sites. A representative example of such material handling equipment is an automated guided vehicle (AGV). An automated guided vehicles may enable optimization and automation of material flows. Such an automated guided vehicle moves along a path guide, such as a reflective tape on the floor, based on a control operation of a control tag positioned on the floor of the work region.

SUMMARY

Principles and embodiments of the present disclosure relate to correcting an unplanned departure of an automated guided vehicle (AGV) from a path guide.

Because an automated guided vehicle moves along a path guide, if the path guide is broken or damaged, it may not be detected and the automated guided vehicle may deviate from the dedicated path. When the automated guided vehicle deviates from the route and proceeds, problems such as accidents may occur in a complex work space. Conventionally, when a certain time elapses after the automated guided vehicle deviates from the route, an alarm is generated to stop the operation of the automated guided vehicle, but there is a problem in that waiting for the process and action time are prolonged accordingly.

Embodiments are intended to stably drive an automated guided vehicle in complex intersections and turning sections by providing a method for returning to normal driving of an automated guided vehicle.

Embodiments address a process standby phenomenon caused by the departure of an automated guided vehicle from a path guide, and reduce the action time for returning to a path guide.

A driving method of an automated guided vehicle according to an embodiment includes a guide sensor and moving along a path guide, first scanning the path guide while rotating at a first predetermined angle, determining whether the path guide is detected during the first scanning, and if the path guide is not detected in the first scanning, performing a second scanning of the path guide while rotating at a second predetermined angle.

A driving method of an automated guided vehicle is provided. The driving method of the automated guided vehicle includes rotating the automated guided vehicle at a first predetermined angle and performing a first scanning of a path guide, determining whether the path guide is detected during the first scanning, and performing a second scanning of the path guide when the path guide is not detected in the first scanning.

Performance of the second scanning may include moving slowly in the driving direction of the automated guided vehicle.

The second scanning may include rotating in a direction opposite to a rotation direction during the first scanning.

The driving method of the automated guided vehicle according to an embodiment may further include when the path guide is detected in at least one of the first scanning or the second scanning, driving the automated guided vehicle normally along the path guide.

The first predetermined angle may be greater than 90 degrees.

The second predetermined angle may be an angle smaller than the first predetermined angle.

The guide sensor is positioned on the lower surface of the automated guided vehicle and includes a plurality of bit sensors, the plurality of bit sensors are arranged as an array extending in a direction crossing the forward driving direction of the automated guided vehicle, and the plurality of bit sensors may be bit-on at positions where the guide sensor and the path guide overlap.

When a plurality of bit sensors positioned at the center portion of the guide sensor are bit-on, it may be determined that the path guide is detected as being normal.

When at least some of the plurality of bit sensors positioned in a portion of the guide sensor other than the central portion are turned on, it may be determined that the path guide has been detected as abnormal.

When an abnormality is detected in the path guide, the automated guided vehicle may perform a driving return by slowly moving until a central portion of the guide sensor overlaps the path guide.

When all of the plurality of bit sensors positioned in the guide sensor are off-bit, it may be determined that the path guide has not been sensed.

When the path guide is not detected, the automated guided vehicle may travel slowly and searches for the path guide, when the path guide is not detected.

A driving method of an automated guided vehicle is provided. The driving method of the automated guided vehicle includes storing information about whether or not a path guide is detected, rotating the automated guided vehicle at 90 degrees, slowly traveling the automated guided vehicle in a direction opposite to the 90-degree rotation direction while searching for the path guide when the path guide is detected during the 90-degree rotation; and driving the automated guided vehicle normally along the path guide when the path guide is detected.

The guide sensor is positioned on the lower surface of the automated guided vehicle and includes a plurality of bit sensors, the plurality of bit sensors extends in a direction crossing the forward driving direction of the automated guided vehicle, and the plurality of bit sensors can be configured to be bit-on at a position where the guide sensor and the path guide overlap.

When a plurality of bit sensors positioned in the center portion of the guide sensor are bit-on, it is determined that the path guide is detected as normal and the automated guided vehicle travels normally along the path guide.

When at least some of the plurality of bit sensors positioned in portions of the guide sensor other than the central portion are bit-on, it is determined that an abnormality is detected in the path guide, and a slow returning driving is performed, so that a central portion of the guide sensor overlaps the path guide.

A driving method of an automated guided vehicle according to an embodiment is a driving method of an automated guided vehicle that includes storing information about whether or not the path guide is detected, rotating the automated guided vehicle at a predetermined angle, slowly traveling the automated guided vehicle in the same forward direction as the rotation direction while searching for the path guide when the path guide is not detected during the rotation; and driving the automated guided vehicle normally along the path guide when the path guide being detected.

The guide sensor is positioned on the lower surface of the automated guided vehicle and includes a plurality of bit sensors, the plurality of bit sensors are arranged as an array extending in a direction crossing the forward driving direction of the automated guided vehicle, and the plurality of bit sensors are configured to be bit-on at a position where the guide sensor and the path guide overlap.

When a plurality of bit sensors positioned in the center portion of the guide sensor are bit-on, it is determined that the path guide is detected as normal, and the automated guided vehicle travels normally along the path guide.

When at least some of the plurality of bit sensors positioned in portions other than the central portion of the guide sensor are bit-on, it is determined that an abnormality is detected in the path guide and a slow returning driving is performed, so that a central portion of the guide sensor overlaps the path guide.

According to embodiments, an automated guided vehicle equipped with a driving return function can stably drive in complex intersections and make turns.

In addition, it is possible to work more efficiently by solving the process waiting phenomenon caused by the departure of the automated guided vehicle from the rotating section and shortening the driving path return time.

BRIEF DESCRIPTION OF THE DRAWINGS

FIG. 12 is a drawing illustrating a result of performing a driving return test according to an embodiment.

DETAILED DESCRIPTION

Figure 1:
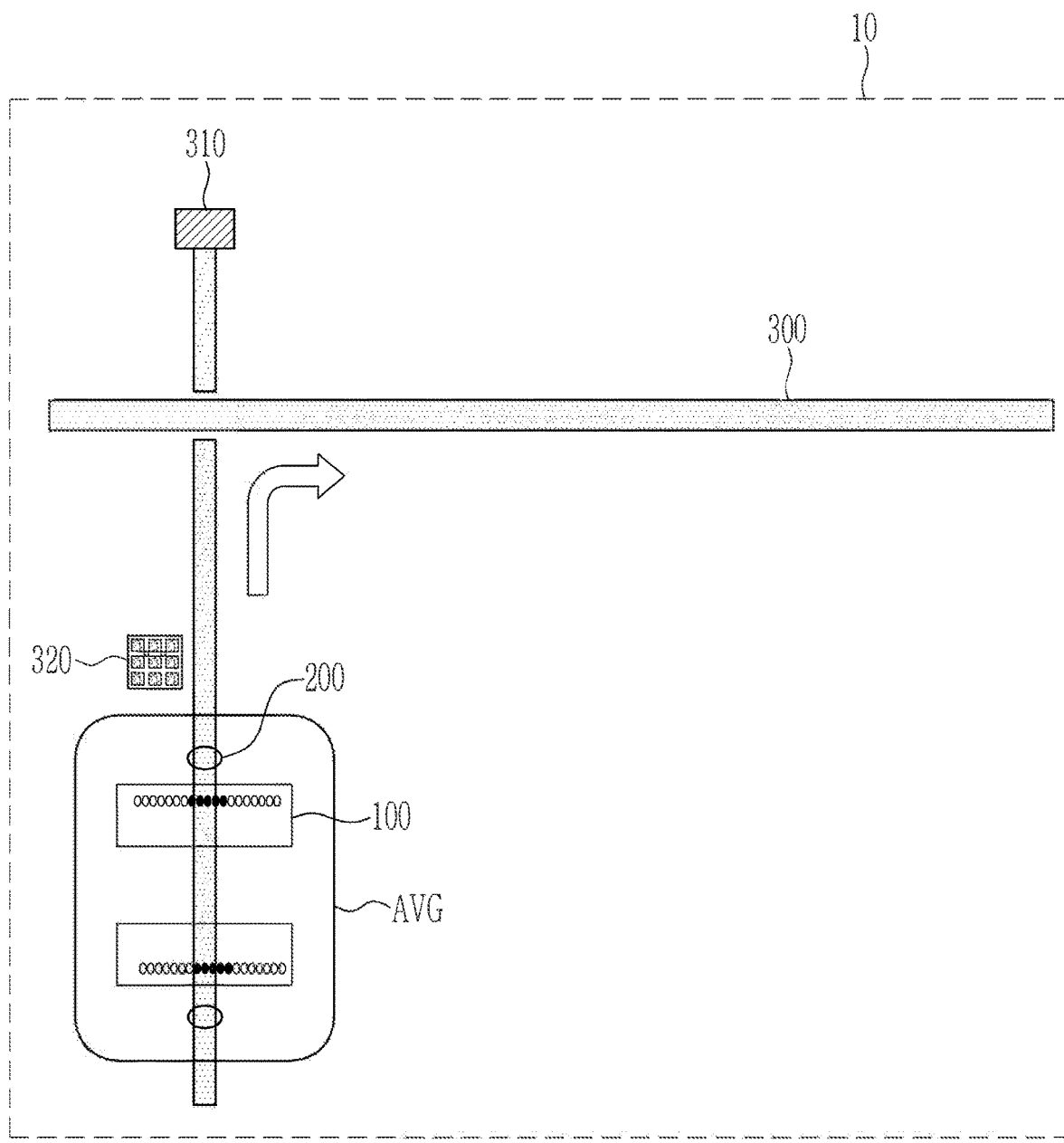
FIG. 1 is a schematic top plan view of a work area according to an embodiment.

Hereinafter, with reference to the accompanying drawings, various embodiments will be described in detail.

In order to clearly describe the various embodiments, the same reference numerals are assigned to the same or similar constituent elements throughout the specification.

In addition, since the size and thickness of each component shown in the drawings are arbitrarily shown for convenience of explanation, and the embodiments are not necessarily limited to that which is shown.

In the drawings, the relative thicknesses may be enlarged to clearly show the various layers and regions.

In addition, when a part such as a layer, film, region, or plate is said to be "above" or "on" another part, this includes not only where it is "directly on" the other part, but also where another part or layer is interposed therebetween.

Conversely, when a part is said to be "directly on" another part, it means that there is no other part in between.

In addition, being "above" or "on" a reference part means being positioned above or below the reference part, and does not necessarily mean being positioned "above" or "on" it in the opposite direction of gravity.

In addition, throughout the specification, when a certain component is said to "include," it means that it may further include other components without excluding other components unless otherwise stated.

In addition, throughout the specification, when reference is made to a "planar image," it refers to a feature being viewed from above, whereas when reference is made to a "cross-sectional image," it refers to a cross section of the target part cut vertically and viewed from a side.

FIG. 1 is a schematic top plan view of a work region according to an embodiment.

FIG. 1 shows an automated guided vehicle (AGV) positioned in a working region 10 and a path guide (300, 310, 320) along which the automated guided vehicle (AGV) travels, viewed from above.

An automated guided vehicle (AGV) according to an embodiment may include an automated guided vehicle or an autonomous mobile robot that transports and loads materials in an indoor or outdoor working region 10.

Referring to FIG. 1, path guides (300, 310, 320) for the automated guided vehicle (AGV) may be disposed on the floor of the work region 10. The path guide indicates a path of travel for the AGV, where path guides (300, 310, 320) may include a path guide 300, an execution node 310, and control tag 320. The path guide 300 may include a reflective material capable of reflecting light.

The automated guided vehicle (AGV) may move along the path guide 300 disposed on the floor.

In an embodiment, the path guide 300 may be implemented with aluminum tape.

The execution node 310 may indicate an execution position of the control command when the automated guided vehicle (AGV) executes the control command. The automated guided vehicle (AGV) may recognize the execution node 310 on the floor, stop, and execute a control operation such as rotation.

In various embodiments, the execution node 310 may include a magnetic tape or the like.

In various embodiments, the control tag 320 may include control operation data, for example a direction change, acceleration driving, deceleration driving, and/or rotation of the automated guided vehicle (AGV).

The control tag 320 may include, for example, a QR code, an RFID tag, a barcode, a beacon, and the like.

In a non-limiting example, the automated guided vehicle (AGV) moves along a path guide 300 that indicates a driving path, recognizes a control tag 320, and changes direction, accelerates, decelerates, and turns based on the control operations included in the control tag 320.

The automated guided vehicle (AGV) according to an embodiment may include a guide sensor 100. The guide sensor 100 can be positioned and configured to detect the path guide 300 passing beneath an AGV. In various embodiments, the guide sensor 100 includes a plurality of bit sensors 110 (refer to FIG. 3), where the plurality of bit sensors 110 may detect the path guide 300. The plurality of bit sensors 110 may be photoelectric sensors or photoelectric sensor modules including a light emitter and a light receiver.

In various embodiments, the plurality of bit sensors 110 may extend in a direction crossing an intended driving direction of the automated guided vehicle (AGV), where the plurality of bit sensors 110 may form a continuous array.

In various embodiments, the plurality of bit sensors may receive light reflected from the path guide 300 to detect the presence or absence of a detection target object.

When the path guide 300 is detected by a plurality of bit sensors disposed in the center of the guide sensor 100, the automated guided vehicle (AGV) can travel normally along the predetermined path guide 300. A method for detecting the path guide 300 in the guide sensor 100 will be described in detail in FIG. 3 to FIG. 5 below.

In this way, the automated guided vehicle (AGV) recognizes the control tag 320 attached to the dedicated route, performs various control operations, etc., and moves along the path guide 300, where the path guide c an provide a predetermined route and driving guide. However, if the path guide 300 is damaged, the automated guided vehicle (AGV) may not detect the route and may leave the path guide 300.

A case in which the automated guided vehicle (AGV) does not normally detect the path guide 300 may be described as route deviation. For example, after the automated guided vehicle (AGV) performs a rotation action, a path deviation may occur, such as an abnormal detection (e.g., side detection) or non-detection of the path guide 300 from the guide sensor 100.

When the automated guided vehicle (AGV) departs from the path guide 300 for more than a predetermined period of time, the automated guided vehicle (AGV) may respond by stopping and generating an alarm. The stopping of one AGV may cause additional AGVs to stop moving, which can cause a back-up. Accordingly, due to congestion of automated guided vehicles (AGV), work logistics delays can occur and process work losses can occur. In addition, a problem can arise, where procedures for returning to the normal route are delayed.

Because the automated guided vehicle (AGV) according to an embodiment has a driving return function, it is possible to solve the above problems.

Figure 2:
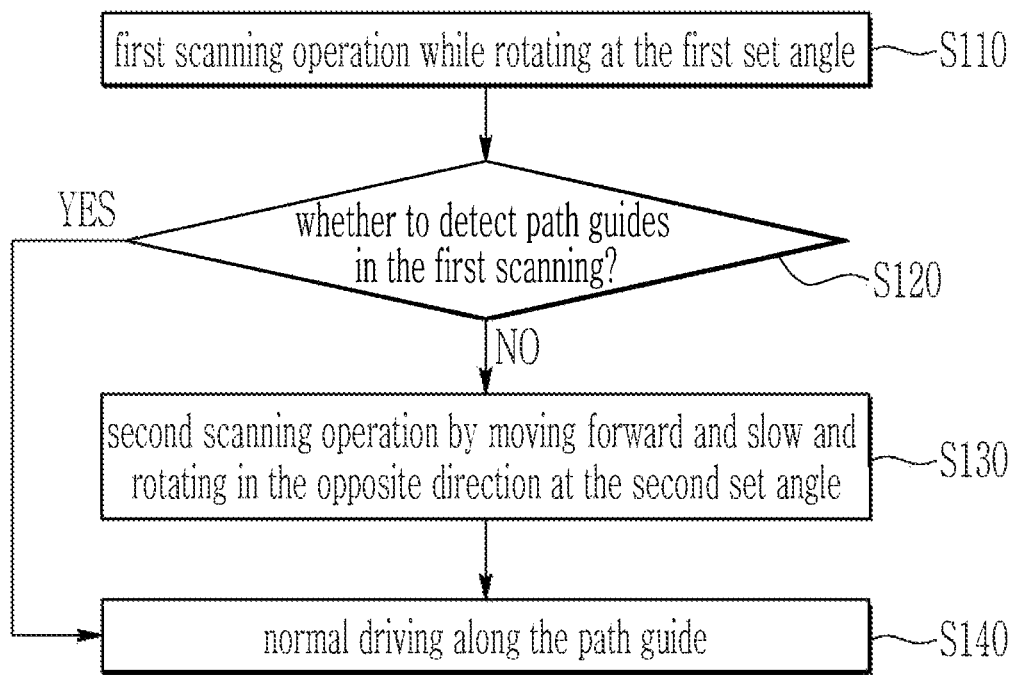
FIG. 2 is a flow chart of a driving return method according to an embodiment.

FIG. 2 is a flowchart illustrating a driving return method according to an embodiment.

Referring to FIG. 2, a method for returning to driving during a 90-degree rotation operation will be briefly described.

In various embodiments. the automated guided vehicle (AGV) may rotate at a first predetermined angle and perform a first scanning operation (S110).

The first scanning operation may be performed from the start of the rotation operation.

The first predetermined angle may be an angle greater than 90 degrees, which is a rotation angle.

The first scanning operation involving a first predetermined angle may be over-rotated by more than the rotation angle of 90 degrees, so the path guide may be sensed over a wide radius during the first scanning operation. The guide sensor may be configured to sense the path guide over a wide radius during the first scanning operation.

In various embodiments, the path guide may be sensed using a guide sensor positioned on the bottom of the automated guided vehicle (AGV). The guide sensor may include a plurality of bit sensors and detect the position of the path guide by receiving light reflected from the path guide. The path guide may be located at a position where a plurality of bit sensors disposed in the guide sensor are detecting the path guide.

In various embodiments, in response to determining that the path guide is detected in a first scanning, the automated guided vehicle (AGV) can drive normally along the path guide (S140) if the path guide is detected, as normal. When the automated guided vehicle (AGV) detects the path guide during the first scan, it can drive normally along the path guide immediately without completing the rotation operation to the first predetermined angle.

When the path guide 300 is not detected in the first scanning, the automated guided vehicle AGV may travel at a low speed, and may rotate in the direction opposite to the first scanning direction at a second predetermined angle. The AGV and guide sensor can execute a second scanning operation (S130).

When the path guide 300 is normally detected in the second scanning, the automated guided vehicle (AGV) can return to driving normally along the path guide 300 (S140). Here, when the automated guided vehicle (AGV) detects the path guide during the second scanning, it can drive normally along the path guide immediately without completing the rotation operation to the second predetermined angle.

In various embodiments, the low-speed driving speed and rotational speed of the automated guided vehicle (AGV) are slower than normal driving speed. For example, when the normal running speed is 40 m/min, the low running speed may be 15 m/min, and the rotational speed may be 7 m/min.

In various embodiments, the normal driving speed, the low-speed driving speed, and the rotational speed can be determined according to a predetermined value, and various changes and adjustments may be applied depending on the detected environment.

Figure 3:
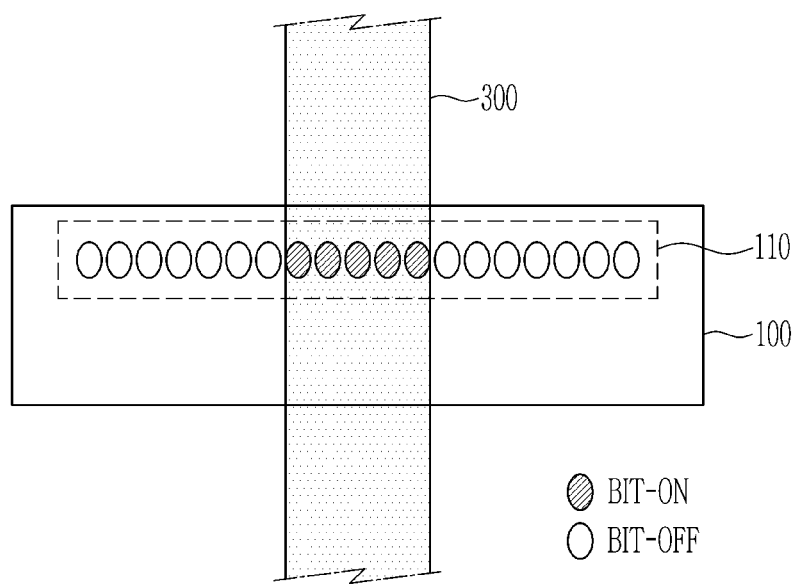
FIG. 3 to FIG. 5 are drawings related to path guide detection and determination according to an embodiment.
Figure 4:
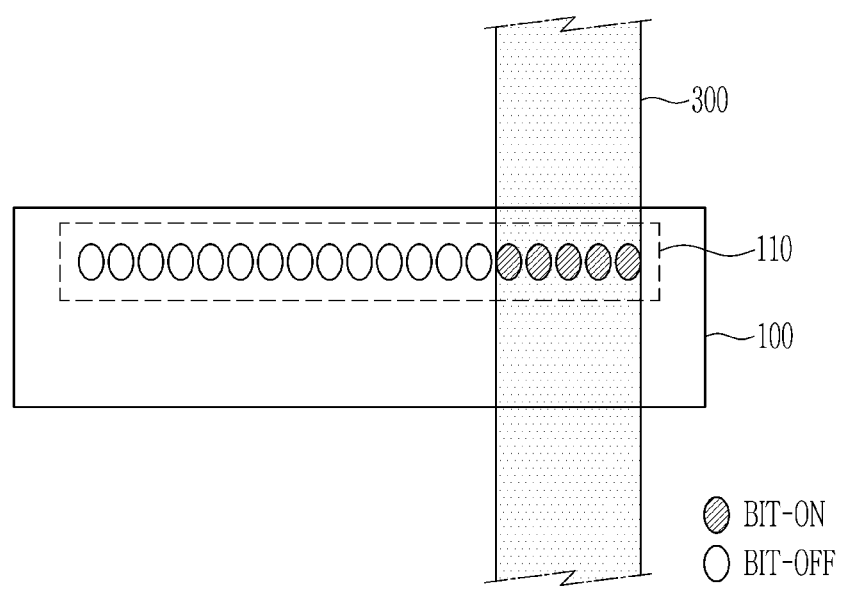
Figure 5:
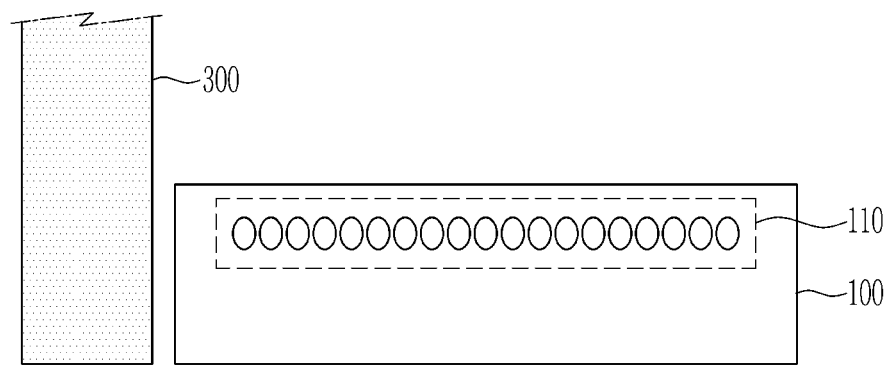

FIG. 3 illustrates an embodiment, where the guide sensor 100 detects the path guide 300 normally, FIG. 4 is a case where the guide sensor 100 detects the path guide 300 abnormally (e.g., side detection), and FIG. 5 is a case where the path guide 300 is not detected by the guide sensor 100.

In various embodiments, the guide sensor 100 is disposed on the bottom of the automated guided vehicle (AGV), and may face downward towards the floor during driving. In various embodiments, a plurality of guide sensors 100 may be mounted on a bottom surface of the AGV, where the plurality of guide sensors 100 may be positioned the detector facing away from the bottom surface of the AGV.

In various embodiments, the guide sensor 100 includes a plurality of bit sensors 110, and the plurality of bit sensors 110 receive light reflected from the guide sensor 100, where the amount of reflected light is used to determine the presence or absence of the path guide 300.

In various embodiments, the plurality of bit sensors 110 may be arranged as an array extending in a direction crossing the forward driving direction of the automated guided vehicle (AGV).

In various embodiments, the plurality of bit sensors 110 may be photoelectric sensors or photoelectric sensor modules including a light emitter and a light receiver. Although the photoelectric sensor and the reflective path guide have been described in one embodiment, the guide sensors and path guides may be configured using various sensors (e.g., magnetic sensors and magnetic path guides) may also be applied according to embodiments.

Referring to FIG. 3 to FIG. 5, the plurality of bit sensors 110 disposed at overlapping positions between the guide sensor 100 and the path guide 300 on the bottom surface can be triggered to be on (e.g., referred to as bit-on), and accordingly, the path guide 300 position can be ascertained. The guide sensor 100 can determine that the path guide 300 exists at a physical position corresponding to the bit-on position of the plurality of bit sensors 110 of the guide sensor 100.

Referring to FIG. 3, when the path guide 300 exists at a position overlapping the central portion of the guide sensor 100, the plurality of bit sensors 110 positioned in the central portion of the guide sensor 100 are bit-on, and the automated guided vehicle (AGV) may determine that the path guide 300 has been normally detected. In this way, when the automated guided vehicle (AGV) detects the path guide 300 as normal, it may perform normal driving along the predetermined path guide 300.

Referring to FIG. 4, when the path guide 300 is present at a position overlapping the side surface of the guide sensor 100, rather than the central portion, a portion of the plurality of bit sensors 110 positioned on the side surface of the guide sensor 100 is turned on, and the automated guided vehicle (AGV) may determine that the path guide 300 has been side-detected (also referred to as abnormally detected).

In this way, when the automated guided vehicle (AGV) detects the path guide 300 as abnormal, the automated guided vehicle may perform an operation for returning the AGV to the path guide 300 to a normally detected driving position.

The driving return operation may refer to an operation in which the plurality of bit sensors 110 positioned in the center of the guide sensor 100 are moved relative to the detected position of the path guide 300, so that they are turned bit-on based on the bit-on data detected by the guide sensor 100.

In an embodiment, the driving return operation may proceed at the same speed as the turning operation. For example, when the rotational speed is 7 m/min, the return speed for the driving return operation may be 7 m/min.

In various embodiments, the rotational speed and the driving return speed are determined according to the predetermined values, and various changes can be applied depending on the embodiment. For example, when the automated guided vehicle (AGV) turns right and the bit sensor 110 positioned on the right side of the guide sensor 100 is bit-on, the path guide 300 is positioned on the right side of the automated guided vehicle (AGV), the automated guided vehicle (AGV) can move slowly to the right so that the bit sensor 110 at the center of the guide sensor 100 is turned on.

Alternatively, when the bit sensor 110 positioned on the left side of the guide sensor 100 is bit-on, the path guide 300 is positioned on the left side of the automated guided vehicle (AGV), and while the automated guided vehicle (AGV) is moving slowly to the left, the bit sensor 110 in the center of the guide sensor 100 may move to turn on the bit.

In FIG. 5, all of the plurality of bit sensors 110 of the guide sensor 100 are in an off-bit state because the automated guided vehicle (AGV) has departed from the path guide 300.

In this case, the automated guided vehicle (AGV) has not detected the path guide 300 and may perform an additional scan to search for the path guide 300, while traveling at low speed. A driving return method according to an embodiment will be described in detail with further reference to FIG. 6 to FIG. 8.

In an embodiment, the automated guided vehicle may perform a 90 degree turn to the right or left.

Hereinafter, the case of turning right will be described.

Figure 6:
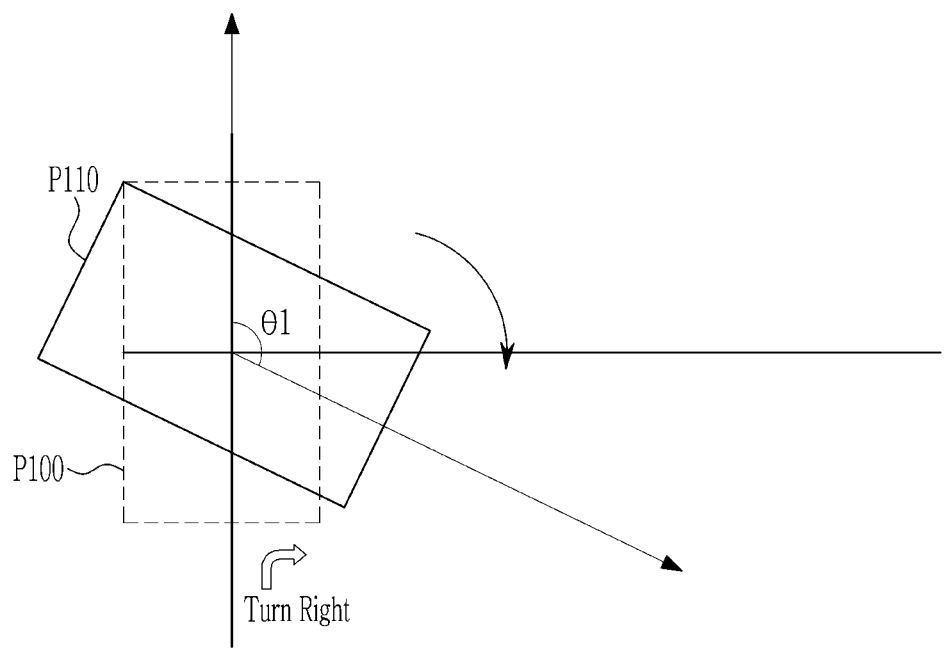
FIG. 6 to FIG. 8 are views for explaining a driving return method according to an embodiment.

FIG. 6 is a drawing illustrating a first scanning operation when the automated guided vehicle makes a right turn.

In step S110, the automated guided vehicle rotates at a first predetermined angle, and the path guide may be first scanned using the guide sensor from the start of rotation. In various embodiments, the automated guided vehicle may rotate rightward from a first position P100 by a first predetermined angle (θ1) and be positioned at the second position (P110). The AGV may start searching for the path guide from the starting point of rotation of the first scanning.

The first predetermined angle θ1 is a rotation angle that is rotated beyond 90 degrees, where the rotation angle is based on the initial forward moving direction of the AGV, and may be predetermined to be about 130 degrees, or in a range of about 110 degrees to about 140 degrees, for example.

Because the first predetermined angle θ1 is an angle more than 90 degrees, it is possible to detect the path guide in a wider radius.

Thereafter, the automated guided vehicle determines whether the path guide is detected during the first scanning (S120).

When a path guide is detected during the first scanning in step S120, the vehicle can travel normally along the predetermined path guide (step S140).

In various embodiments, the automated guided vehicle may drive normally according to the predetermined path guide, when it is determined that the path guide overlaps the central portion of the guide sensor (e.g., normal detection).

In various embodiments, when the automated guided vehicle detects a path guide 300 during the first scanning, it may directly drive along the path guide 300 without completing the rotation operation to the first predetermined angle.

In various embodiments, when the path guide 300 is detected on the side portion of the guide sensor or only part of the path guide 300 is detected (e.g., abnormal detection), the AGV may move in a direction such that the central portion of the guide sensor overlaps the path guide and returns to driving. The automated guided vehicle can drive at low speed based on the measured detection location until the path guide 300 is normally detected by the guide sensor 100, and it can navigate the path guide, after normally detecting the path guide.

For example, when turning right, if a bit located on the right side of the guide sensor 100 is turned on, the path guide is positioned on the right side of the automated guided vehicle. Thereafter, when the path guide is normally detected, the automated guided vehicle may drive along the predetermined path guide.

If the path guide is not detected in step S120, the AGV rotates to a second predetermined angle in the direction opposite from the rotation direction during the first scanning S110, and may perform a second scanning of the path guide (S130).

Figure 7:
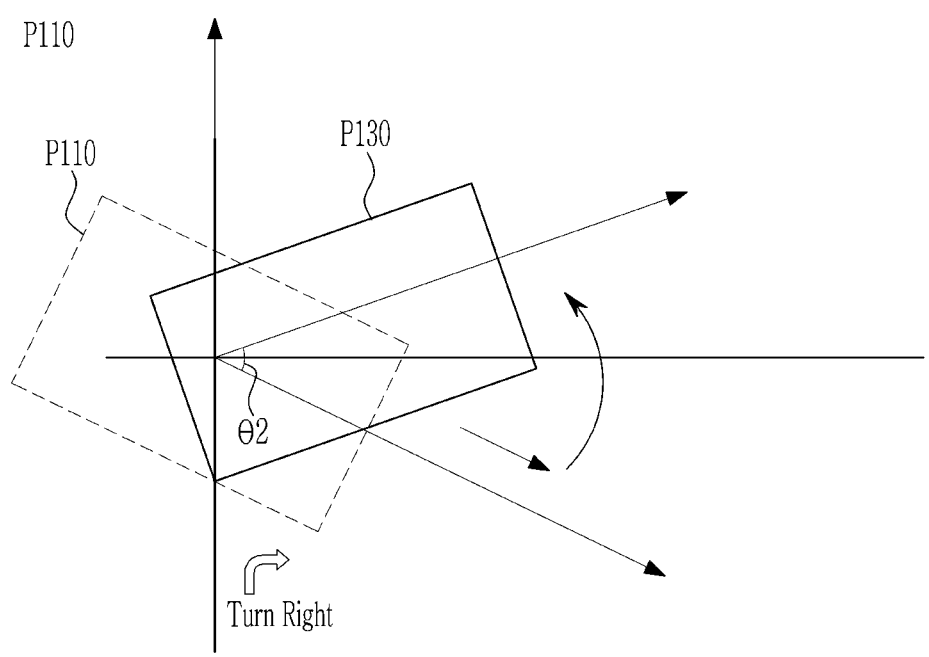

FIG. 7 is a drawing illustrating the second scanning operation of the automated guided vehicle.

Referring to FIG. 7, the automated guided vehicle (AGV) moves forward slowly from the second position (P110) where the first scanning is finished, and rotates in the direction opposite to the rotation direction during the first scanning to a second predetermined angle (θ2). The AGV may be positioned at position 3 (P130) and oriented in a new direction along the second predetermined angle (θ2).

In various embodiments, the second predetermined angle (θ2) may be smaller than the first predetermined angle (θ1). For example, the second predetermined angle (θ2) may be within a range of approximately 40 degrees to 70 degrees, or approximately 60 degrees based on the traveling direction of the automated guided vehicle.

During the scan, the automated guided vehicle travels forward and slowly in the driving direction and scans in the opposite direction to the first scanning, so even if some of the path guides are damaged, the existing path guides can be detected after passing through the damaged routes.

In various embodiments, during the first scanning, even if the path guide is partially disconnected and not detected, the second scanning is performed in the opposite direction, while moving forward slowly, so that the path guide can be detected at the point where the path guide is again continuous.

Subsequently, when the automated guided vehicle detects the path guide as normal, it drives normally along the predetermined path guide (step S140).

Figure 8:
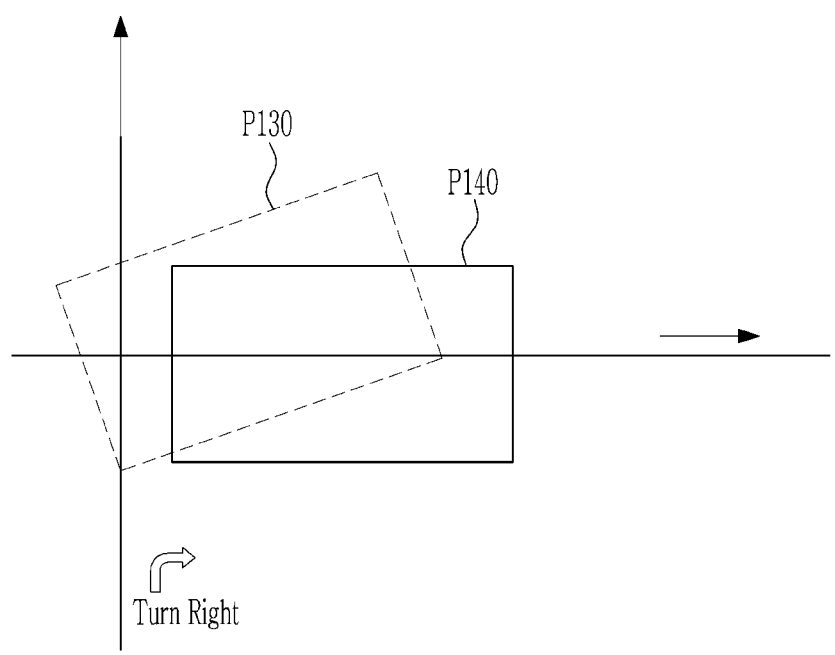

Referring to FIG. 8, the automated guided vehicle may detect a path guide on the right side of the guide sensor at the third position (P130) where the second scanning is finished, and perform a driving return operation. That is, the automated guided vehicle may move to the fourth position (P140) while driving to the right at a low speed based on the detected bit data.

The fourth position (P140) may be a normal sensing position, where a path guide overlaps with the center of the guide sensor positioned on the bottom of the automated guided vehicle, and a plurality of bit sensors positioned in the center of the guide sensor are bit-on. The automated guided vehicle that has moved to the fourth position (P140) may normally drive along the path guide.

The automated guided vehicle, according to various embodiments, first scans the path guide 300 from the start of rotation, moves forward slowly when the path guide 300 is not detected, and performs a second scan in the opposite direction to the first scan. Therefore, it can be possible to drive without departing from the path guide 300.

Accordingly, since it is possible to drive without departing from the path guide even in complicated movement and rotation sections of logistics, loss in waiting for logistics or loss in work actions can be reduced.

Figure 9:
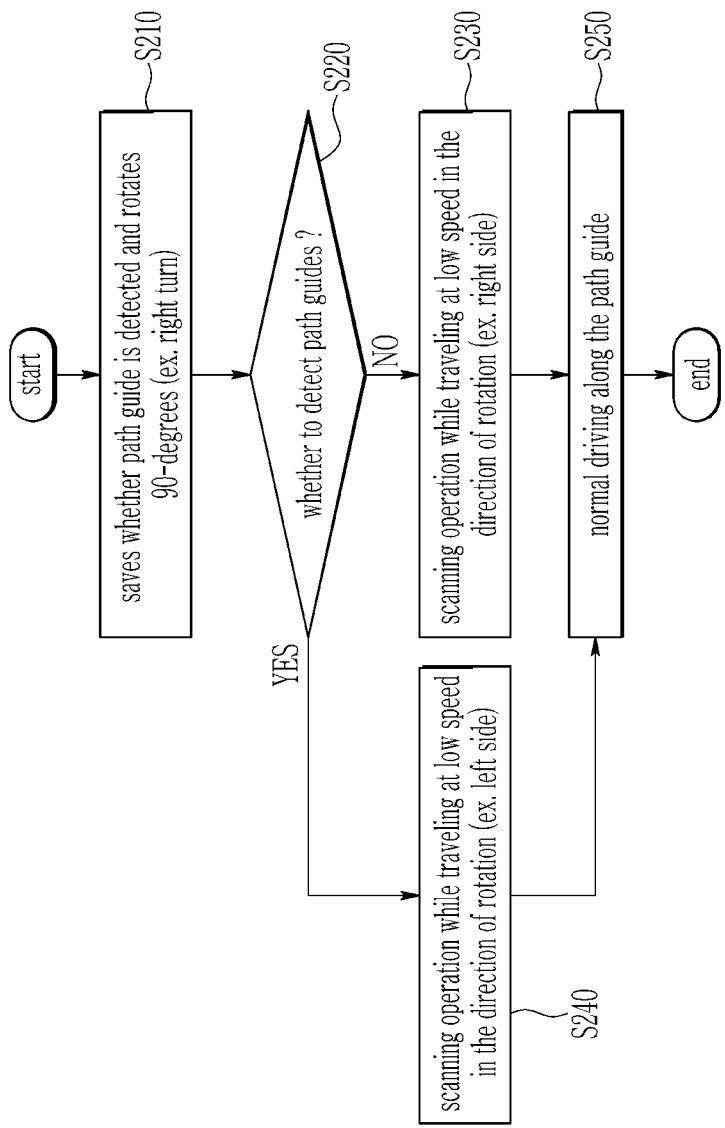
FIG. 9 is a flowchart of a driving return method according to an embodiment.

FIG. 9 is a flowchart illustrating a driving return method according to an embodiment.

Referring to FIG. 9, a method for returning to driving during a 90-degree rotation operation will be described, according to an embodiment.

In various embodiments, the automated guided vehicle stores information about whether or not the path guide is detected, and rotates 90 degrees (S210).

In various embodiments, the automated guided vehicle completes the 90-degree rotation operation, while storing the detection information, even if the path guide is detected during the rotation operation.

In various embodiments, it is determined whether or not the path guide has been sensed during the 90-degree rotation operation (S220).

Subsequently, when there is no history of detecting the path guide 300 during the 90-degree rotation operation in step S220, a scan operation for searching for a path guide is performed, while traveling at a low speed in the rotation direction (S230).

On the other hand, if there is a history of detecting the path guide during a rotation of 90 degrees, a scan operation for searching for the path guide is performed while traveling at a low speed in the opposite direction (S240).

Thereafter, when the path guide is normally detected, the automated guided vehicle normally drives along the path guide (S250).

Further referring to FIG. 10 and FIG. 11, a driving return method according to an embodiment during a rotational operation will be described.

Figure 10:
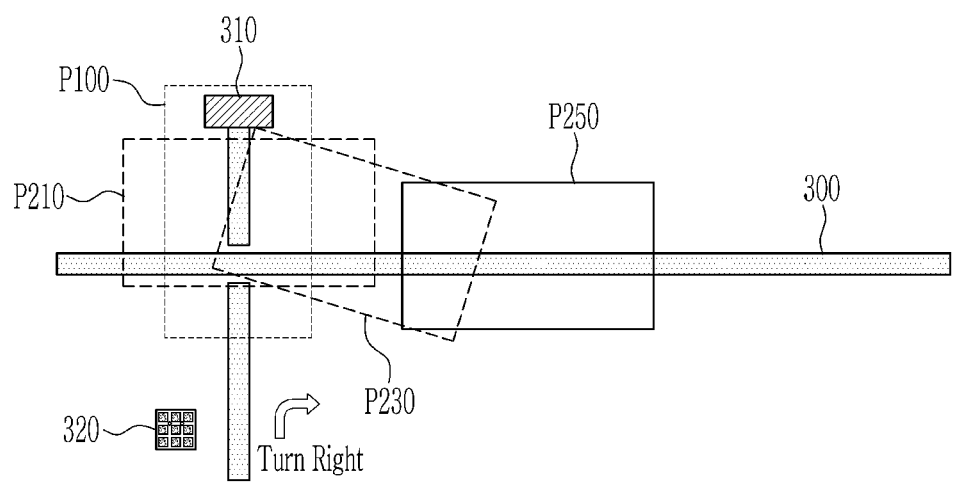
FIG. 10 and FIG. 11 are drawings for explaining a driving return method according to an embodiment.

FIG. 10 illustrates a driving return method when the path guide is not detected during a 90-degree rotation scan to the right.

Figure 11:
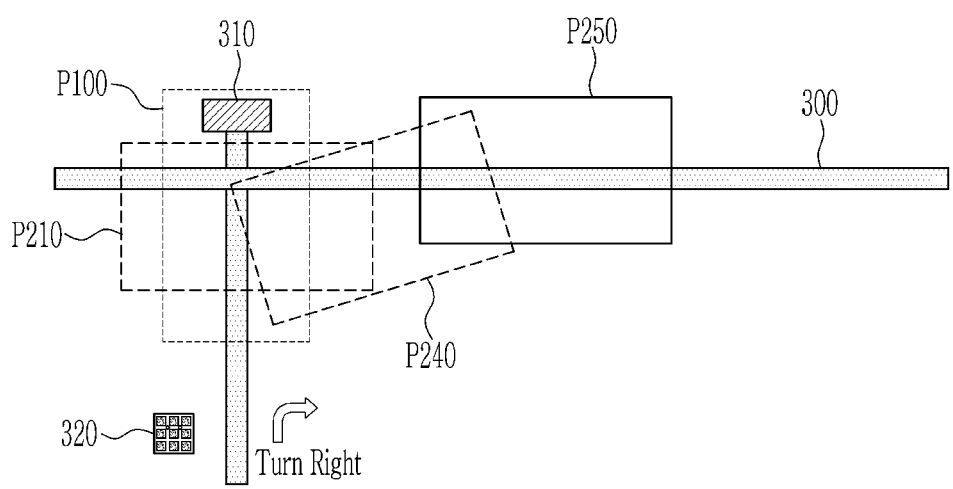

FIG. 11 illustrates a driving method when the path guide is detected during a 90-degree rotation scan to the right.

Referring to FIG. 10, the automated guided vehicle recognizes a control tag 320 positioned on a surface over which the AGV is travelling and moves to an execution node 310, which is the starting position for turning right.

The execution node 310 may be sensed through a magnetic sensor disposed under the automated guided vehicle. The execution node 310 may be sensed in a manner different from the path guide 300.

In various embodiments, the automated guided vehicle may move to the second position P210 from the first position P100 by rotating 90 degrees to the right, where the execution node 310 is recognized.

The automated guided vehicle according to an embodiment may store information about whether or not the path guide 300 was detected during a 90-degree rotation scan.

In various embodiments, the automated guided vehicle completes the 90-degree rotation operation, while storing the detection information, even if the path guide 300 is detected during the rotation operation.

Subsequently, when the path guide 300 is not detected during the right turn scan of 90 degrees, the path guide 300 may be predicted to be positioned on the right side of the automated guided vehicle's turning direction. Accordingly, the automated guided vehicle may search for the path guide 300 while traveling at a low speed to the right from the second position 210, where the rotation is completed.

Subsequently, the automated guided vehicle may move to a third position P230, where the path guide 300 is sensed. At the third position (P230), the automated guided vehicle may side detect the path guide 300. In response to detecting the side of the path guide 300, the automated guided vehicle (AGV) may perform an operation for returning to driving.

In this way, when the automated guided vehicle (AGV) detects the side of the path guide 300, the automated guided vehicle may perform an operation for returning the path guide 300 to driving.

In various embodiments, the driving return operation may refer to an operation in which the plurality of bit sensors 110 positioned in the center of the guide sensor 100 move to turn on the bit based on the bit data sensed by the guide sensor 100.

In various embodiments, the automated guided vehicle may search for a path guide 300 based on the measured detection position until the path guide 300 is normally detected by the guide sensor 100. The AGV can move to the normally detected fifth position P250, and the predetermined the path, the AGV can continue driving normally by following the guide.

Referring to FIG. 11, the automated guided vehicle recognizes a control tag 320 positioned on a surface over which the AGV is travelling, and moves to the execution node 310, which is the starting position for turning right.

In various embodiments, the execution node 310 may be sensed through the magnetic sensor disposed under the automated guided vehicle.

The automated guided vehicle may move to the second position P210 by rotating 90 degrees to the right from the first position P100, where the execution node 310 is recognized.

In various embodiments, the automated guided vehicle may store information about whether or not the path guide 300 was detected during a 90-degree rotation scan.

In various embodiments, the automated guided vehicle completes the 90-degree rotation operation, while storing only the detection information, even if the path guide is detected during the rotation operation.

Subsequently, when the path guide 300 is detected during the right turn scan of 90 degrees, it can be predicted that the path guide 300 is positioned on the left side opposite to the rotation direction of the automated guided vehicle. Accordingly, the automated guided vehicle may search for the path guide 300 while traveling at low speed to the left from the second position 210 where the rotation is completed.

Subsequently, the automated guided vehicle may move to a fourth position P240, where the path guide 300 is sensed.

At the fourth position P240, the automated guided vehicle may side detect the path guide 300.

In response to detecting the side of the path guide 300, the automated guided vehicle (AGV) may perform an operation for returning to driving.

In various embodiments, the automated guided vehicle may perform path guide exploration based on the detected position measured until the path guide is detected normally by the guide sensor 100, and can drive normally along the predetermined path guide after moving to the detected fifth position P250, where the path guide 300 is detected normally.

In various embodiments, the automated guided vehicle stores information about whether or not the path guide 300 is detected when turning 90 degrees, and returns to driving according to whether or not the detection information is ascertained, so that it can travel without departing from the driving path. Accordingly, since it is possible to drive without departing from the path guide even in complicated movement and rotation sections of logistics, loss in waiting for logistics or loss in work actions can be reduced.

FIG. 12 shows a table of simulation results obtained by performing the driving return test, according to an embodiment.

An automated guided vehicle (AGV) detects a control tag 320 (e.g., a 90-degree right turn command), moves a predetermined distance to an execution node 310 (e.g., a starting position to start a right turn), and then performs a turn.

Referring to FIG. 12, the AGV stop positions for starting the rotation of the automated guided vehicle (AGV), including a wrong tag position, a right position, and a run over position, can be distinguished.

In the experiment, for each case where the moving distance to the stop position is 500 mm, 630 mm, 700 mm, and 800 mm, the first scanning angle is predetermined to 110 degrees, 120 degrees, 130 degrees, and 140 degrees, and the second scanning angle is 40 degrees, 50 degrees, 60 degrees, and 70 degrees, and the driving test for each case was repeated 5 times.

Referring to the test results of FIG. 12, when the rotation is performed at a wrong tag position, where the moving distance of the automated guided vehicle (AGV) is 500 mm or more, the first scanning angle is 130 to 140 degrees, and the second scanning angle is 130 to 140 degrees. When the scanning angle is 60 degrees to 70 degrees, it can be confirmed that an optimal test result with a high driving return success rate is obtained.

In addition, when rotation is performed at a position where the moving distance is 630 mm, which is the normal stop position of the automated guided vehicle (AGV), and a position where the moving distance is 700 mm, which is a little further from the normal stop position, the first scanning angle is 110 degrees to 110 degrees, it can be confirmed that returning to driving has been successful in all cases where the angle is 140 degrees and the second scanning angle is between 40 degrees and 70 degrees.

On the other hand, in the case of performing rotation in a run over position where the moving distance of the automated guided vehicle (AGV) is 800 mm, the first scanning angle is 130 degrees to 140 degrees, and the second scanning angle is 60 degrees to 70 degrees, in the case of 70 degrees, it can be confirmed that an optimal test result with a high driving return success rate is obtained.

In this way, according to the driving method of the automated guided vehicle, according to an embodiment, even when the AGV does not proceed or over-progress to the normal stop position for starting rotation, the path guide 300 is normally detected through the first scanning and the second scanning, and the path guide is normally detected.

Also, through the driving return test, it can be confirmed that if the primary set angle for the first scanning is approximately 130 to 140 degrees, and the second set angle for the second scanning is approximately 60 to 70 degrees, it can have the optimal driving return success rate at all stop positions.

Although the embodiments have been described in detail above, the scope of the embodiments of the present invention is not limited thereto, and various modifications and improvements that can be made by a person of an ordinary skill in the art using the basic concepts of the present disclosure are encompassed in the following claims.

DESCRIPTION OF SYMBOLS

AGV: automated guided vehicle
100: guide sensor
110: plurality of bit sensors
10: working region
300: path guide
310: execution node
320: control tag

What is claimed is:

1. A driving method for an automated guided vehicle, comprising:
   rotating the automated guided vehicle at a first predetermined angle and performing a first scanning of a path guide;
   determining whether the path guide is detected during the first scanning; and
   performing a second scanning of the path guide when the path guide is not detected in the first scanning.

2. The driving method for the automated guided vehicle of claim 1, wherein:
   the second scanning includes slowly traveling in a driving direction of the automated guided vehicle.

3. The driving method for the automated guided vehicle of claim 1, wherein:
   the second scanning includes rotating in a direction opposite to a rotation direction during the first scanning.

4. The driving method for the automated guided vehicle of claim 1, further comprising:
   when the path guide is detected in at least the first scanning or the second scanning, driving the automated guided vehicle normally along the path guide.

5. The driving method for the automated guided vehicle of claim 1, wherein:

the first predetermined angle is an angle greater than 90 degrees.

6. The driving method for the automated guided vehicle of claim 1, wherein:
a second predetermined angle is an angle smaller than the first predetermined angle.

7. The driving method for the automated guided vehicle of claim 1, wherein the automated guided vehicle comprises:
a guide sensor positioned on a lower surface of the automated guided vehicle and includes a plurality of bit sensors,
the plurality of bit sensors are arranged as an array extending in a direction crossing a forward driving direction of the automated guided vehicle; and
the plurality of bit sensors are bit-on at a position where the guide sensor and the path guide overlap.

8. The driving method for the automated guided vehicle of claim 7, wherein:
the path guide is sensed as being normal when the plurality of bit sensors positioned in a center portion of the guide sensor are bit-on.

9. The driving method for the automated guided vehicle of claim 7, wherein:
the path guide is detected as abnormal when at least some of the plurality of bit sensors positioned in portions of the guide sensor other than a central portion are bit-on.

10. The driving method for the automated guided vehicle of claim 9, wherein:
the automated guided vehicle performs a driving return by slowly moving until the central portion of the guide sensor overlaps the path guide, when an abnormality is detected in the path guide.

11. The driving method for the automated guided vehicle of claim 7, wherein:
the path guide has not been detected when all of the plurality of bit sensors positioned in the guide sensor are bit-off.

12. The driving method for the automated guided vehicle of claim 11, wherein:
the automated guided vehicle travels slowly and searches for the path guide, when the path guide is not detected.

13. A driving method for an automated guided vehicle, comprising:
storing information about whether or not a path guide is detected;
rotating the automated guided vehicle at 90 degrees;
slowly traveling the automated guided vehicle in a direction opposite to a 90-degree rotation direction while searching for the path guide when the path guide is detected during a 90-degree rotation; and
driving the automated guided vehicle normally along the path guide when the path guide is detected.

14. The driving method for the automated guided vehicle of claim 13, wherein:
a guide sensor is positioned on a lower surface of the automated guided vehicle, wherein the guide sensor includes a plurality of bit sensors;
the plurality of bit sensors extends in a direction crossing a forward driving direction of the automated guided vehicle; and
the plurality of bit sensors are configured to be bit-on at a position where the guide sensor and the path guide overlap.

15. The driving method for the automated guided vehicle of claim 14, wherein:
when the plurality of bit sensors positioned in a center portion of the guide sensor are bit-on, it is determined that the path guide is detected as normal and the automated guided vehicle travels normally along the path guide.

16. The driving method for the automated guided vehicle of claim 14, wherein:
when at least some of the plurality of bit sensors positioned in portions of the guide sensor other than a central portion are bit-on, it is determined that an abnormality is detected in the path guide, and a slow returning driving is performed, so that the central portion of the guide sensor overlaps the path guide.

17. A driving method for an automated guided vehicle, comprising:
storing information about whether or not a path guide is detected;
rotating the automated guided vehicle at a predetermined angle;
slowly traveling the automated guided vehicle in a same forward direction as a rotation direction while searching for the path guide when the path guide is not detected during the rotation; and
driving the automated guided vehicle normally along the path guide when the path guide being detected.

18. The driving method for the automated guided vehicle of claim 17, wherein:
a guide sensor is positioned on a lower surface of the automated guided vehicle, wherein the guide sensor includes a plurality of bit sensors;
the plurality of bit sensors are arranged as an array extending in a direction crossing a forward driving direction of the automated guided vehicle; and
the plurality of bit sensors are configured to be bit-on at a position where the guide sensor and the path guide overlap.

19. The driving method for the automated guided vehicle of claim 18, wherein:
when the plurality of bit sensors positioned in a center portion of the guide sensor are bit-on, it is determined that the path guide is detected as normal, and the automated guided vehicle travels normally along the path guide.

20. The driving method for the automated guided vehicle of claim 18, wherein:
when at least some of the plurality of bit sensors positioned in portions other than a central portion of the guide sensor are bit-on, it is determined that an abnormality is detected in the path guide and a slow returning driving is performed, so that a central portion of the guide sensor overlaps the path guide.

* * * * *